(No Model.)

B. G. LAMME.
SYSTEM OF ELECTRICAL DISTRIBUTION.

No. 599,943. Patented Mar. 1, 1898.

WITNESSES:

INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION.

SPECIFICATION forming part of Letters Patent No. 599,943, dated March 1, 1898.

Application filed September 18, 1897. Serial No. 652,171. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Systems of Electrical Distribution, (Case No. 754,) of which the following is a specification.

My invention relates to systems of electrical distribution, and particularly to such systems as involve the transmission of energy to a considerable distance for the operation of translating devices constituting a variable load upon the system—such, for example, as railway-motors.

The object of my invention is to provide means for varying the electromotive force of a circuit or feeder automatically in proportion to load without the employment of apparatus specially designed or constructed for this specific purpose.

It is the usual well-known practice to supply long feeders such as those employed in connection with electric-railway work by means of generators, the field-magnets of which are so wound as to overcompound in order to provide a greater electromotive force for an increased load upon the circuit. In the case of suburban or interurban railways, however, it has been found necessary to employ some additional means. The additional increase of electromotive force in order to provide the necessary voltage throughout the line has been usually secured by means of a series-wound generator connected in the positive branch of the feeder-circuit, and while such a booster serves to effect the desired result it is of necessity a machine specially constructed and wound for the particular purpose for which it is used.

I propose by my present invention to employ the ordinary compound-wound machine as a booster, and thus obviate the necessity of constructing a special machine for this work.

Figure 1:
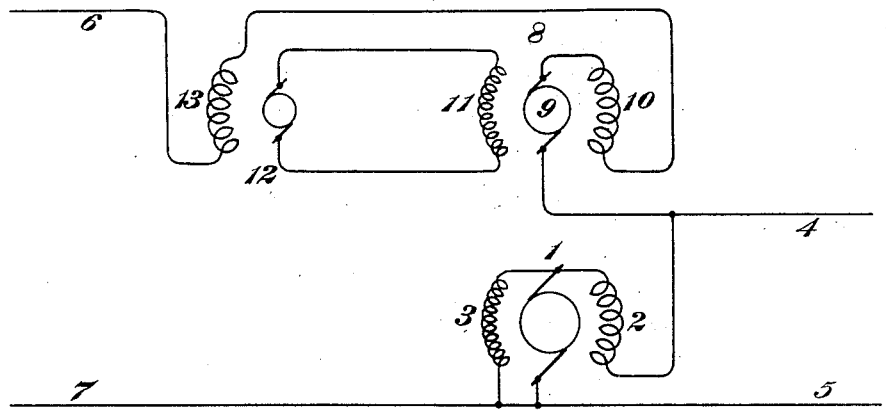
Figure 2:
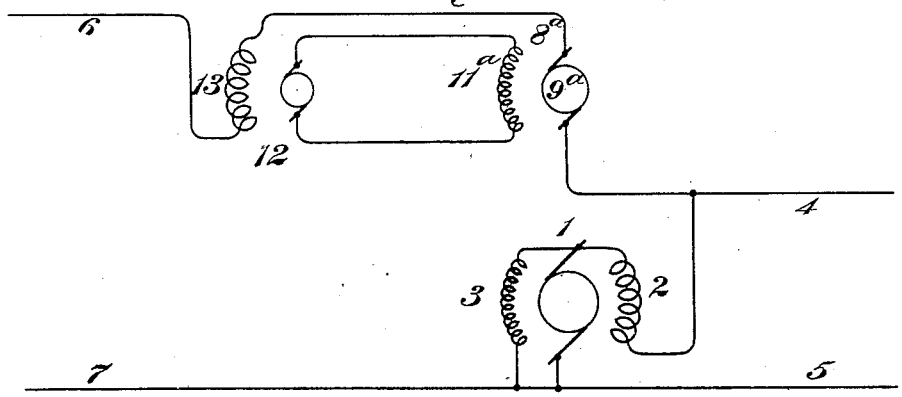

In the accompanying drawings, Figure 1 is a diagram of machines and circuits, illustrating my invention; and Fig. 2 is a similar diagram of a modification.

Referring particularly to Fig. 1 of the drawings, 1 is the main generator for the system, which may be of usual construction, having a series-winding 2 and shunt-winding 3. This generator is shown as supplying a circuit 4 5, which may, for example, be a railway-circuit of comparatively short or moderate length, and circuit 6 7, which may, for example, be a suburban or other line of very much greater length, in which there would be a very considerable drop in voltage unless some special means were employed for raising it above that supplied by the machine 1.

For the purpose of raising that electromotive force in proportion to the load on the circuit I employ a compound-wound generator 8, the armature 9 and series winding 10 of which are connected in series with the generator 1 in the branch 6 of the circuit 6 7. The winding 11 of this machine, which under ordinary conditions would be the shunt-winding, I connect to the brushes of an exciter 12, the field-magnet winding 13 of such exciter being connected in series in the branch 6 of the circuit 6 7, so that the entire current supplied to such circuit passes through it. It will be understood that with this arrangement of apparatus as the feeder-current changes in load upon the circuit the excitation of the coil 11 will change, and consequently the boosting effect of the generator 8 will be varied correspondingly. This boosting of the electromotive force may also be effected by the means shown in Fig. 2, in which the generator 1, its field windings 2 and 3, the circuits 4 5 and 6 7, the armature $9^a$ and field-magnet winding $11^a$ of the booster $8^a$, the exciter 12, and its field-magnet winding 13 are the same as the corresponding parts shown in Fig. 1 and hereinbefore described. In this organization of apparatus, however, the machine $8^a$ has no series field-magnet winding, the current from the machine 1 passing through its armature $9^a$ and the field-magnet winding 13 of the machine 12. In this case, as in the one before described, however, it will be seen that the entire feeder-current passes through the field-magnet winding of the exciter, and that consequently the excitation of the field-magnet of the booster will vary with the load, and as a result that the boosting of the electromotive force will vary in the same degree.

I claim as my invention—

1. The combination with a main direct-current generator and a work-circuit supplied thereby, of an auxiliary compound-wound generator having one portion of its field-magnet winding in series with its armature and with the main generator, and another portion provided with means for varying its excitation as the load on the work-circuit varies.

2. The combination with a main direct-current generator, a work-circuit supplied thereby, and an auxiliary generator acting as a booster of electromotive force, of an exciter for said auxiliary generator having its field-magnet coils connected in series in the feeder or work circuit.

3. Means for varying the electromotive force of a work-circuit in accordance with changes in load comprising an auxiliary generator having a series field-magnet winding and a separately-excited winding, in combination with an exciter for the latter having a field-magnet winding which is traversed by the feeder-current.

4. In a system of electrical distribution, the combination with a main generator and a generator acting as a booster of electromotive force, of an exciter for said booster field-magnet having its field-magnet winding traversed by the current supplied to the translating devices.

In testimony whereof I have hereunto subscribed my name this 15th day of September, A. D. 1897.

BENJ. G. LAMME.

Witnesses:
WESLEY G. CARR,
H. C. TENER.